United States Patent
Wade et al.

(10) Patent No.: US 9,298,956 B2
(45) Date of Patent: Mar. 29, 2016

(54) TAMPER PROTECTION MESH IN AN ELECTRONIC DEVICE

(71) Applicant: Square, Inc., San Francisco, CA (US)

(72) Inventors: Jeremy Wade, San Francisco, CA (US); Thomas Templeton, San Francisco, CA (US); Trent Weber, San Francisco, CA (US); Michael Lamfalusi, Cupertino, CA (US)

(73) Assignee: Square, Inc., San Francisco, CA (US)

( * ) Notice: Subject to any disclaimer, the term of this patent is extended or adjusted under 35 U.S.C. 154(b) by 344 days.

(21) Appl. No.: 14/046,791

(22) Filed: Oct. 4, 2013

(65) Prior Publication Data

US 2015/0097572 A1    Apr. 9, 2015

(51) Int. Cl.
*G01R 31/08* (2006.01)
*G06K 7/00* (2006.01)

(52) U.S. Cl.
CPC ............ *G06K 7/0095* (2013.01); *G06K 7/0078* (2013.01); *Y10T 29/49117* (2015.01)

(58) Field of Classification Search
CPC .............. H05K 1/0275; G06F 21/86; G06K 19/07381; G06K 7/0095; G06K 7/0078
USPC ............................. 340/541; 713/194; 726/23
See application file for complete search history.

(56) References Cited

U.S. PATENT DOCUMENTS

| | | | |
|---|---|---|---|
| 5,666,265 A | 9/1997 | Lutz et al. | |
| 2006/0102458 A1 | 5/2006 | Kim et al. | |
| 2008/0284610 A1 | 11/2008 | Hunter | |
| 2010/0327856 A1* | 12/2010 | Lowy | G06F 21/86 324/207.16 |
| 2011/0031985 A1* | 2/2011 | Johnson | G06F 21/86 324/681 |
| 2013/0055416 A1* | 2/2013 | Ma | G06F 21/86 726/34 |
| 2013/0104252 A1* | 4/2013 | Yanamadala | G06F 21/76 726/34 |
| 2013/0111227 A1 | 5/2013 | Sauerwein, Jr. | |

FOREIGN PATENT DOCUMENTS

KR    10-2008-0105500 A    12/2008

OTHER PUBLICATIONS

D. Balaban, Google's Schmidt Predicts Contactless Terminal Rollout, NFC Times, Jun. 23, 2011.*
International Search Report and Written Opinion mailed Dec. 19, 2014 for International Patent Application No. PCT/US2014/057044, filed Sep. 23, 2014.

* cited by examiner

*Primary Examiner* — Daniel Miller
(74) *Attorney, Agent, or Firm* — Perkins Coie LLP

(57) ABSTRACT

A technique for tamper protection in an electronic device is disclosed. A conductive mesh is affixed onto one or more interior surfaces of the outer housing of the device. The mesh includes one or more conductive traces coupled to one or more detectors within the device. The detector can detect an open-circuit or short-circuit condition resulting from an unauthorized attempt to open the housing, and output a signal to trigger an appropriate countermeasure. The electrical contacts along the trace that are monitored can be selected differently from one manufactured unit to the next, and can be selected based on a randomness function. The selection of contacts may be made during or after manufacturing of the device. The mesh can include multiple metal traces that run very close together, in parallel, across one or more interior surfaces of the housing, allowing detection of both open-circuit and short-circuit conditions.

14 Claims, 13 Drawing Sheets

TAMPER PROTECTION MESH IN AN ELECTRONIC DEVICE

BACKGROUND

For certain kinds of products, it is particularly important to protect against physical tampering after the product has been sold or distributed to an end user. For example, tampering is of particular concern for certain types of electronic devices, such as devices that store or process private information, or devices that individuals may be tempted to "hack" in order to use functions and capabilities that they are not authorized to use.

A conventional technique for detecting tampering in an electronic device is to enshroud the sensitive components within the device with a wire mesh that is disposed on a flexible substrate. The wire mesh is connected to an electrical power source and to a detector within the device. Typically such a wire mesh enshrouds a single circuit board. The mesh fits loosely around the entire circuit board, such that any attempt to physically access the components on the circuit board will likely damage the mesh to the extent of causing an open circuit condition in the mesh. The detector detects this condition and can trigger an appropriate countermeasure in response.

While a flexible mesh such as described above provides some degree of tampering protection, it is not impossible for a determined wrongdoer to circumvent it. Further, it is possible to open the electronic device without necessarily damaging the mesh, and therefore, without necessarily triggering anti-tampering countermeasures. Additionally, the wire mesh adds to the overall cost of the device.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
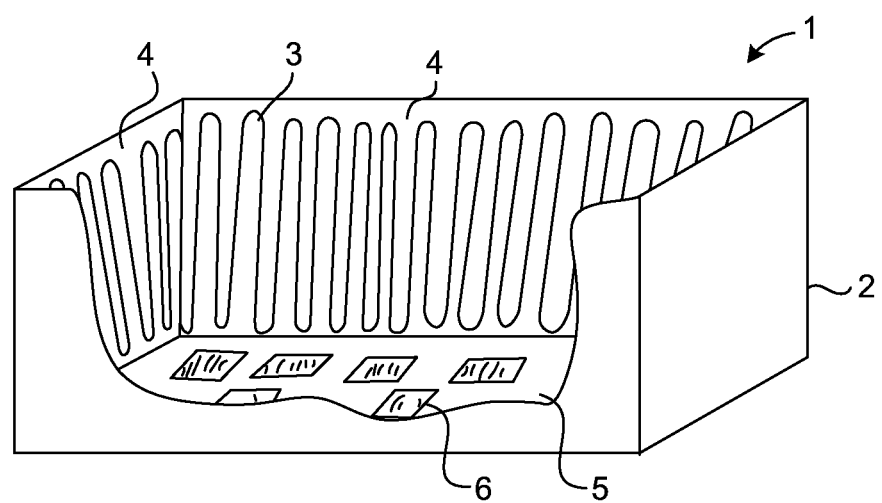
FIG. 1 illustrates a simplified example of an electronic device that has a tamper detection mesh affixed to an interior surface of its housing.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Introduced here is a technique for providing tamper protection in an electronic device. In at least some embodiments, the technique includes permanently affixing a conductive mesh onto one or more interior surfaces of the outer housing of the electronic device. A "mesh" in this context refers to one or more conductive (e.g., metal) traces that are coupled to one or more detectors within the electronic device, and which may be but are not necessarily electrically coupled to each other. The detector(s) can detect either an open-circuit or short-circuit condition (or both) that results from an unauthorized attempt to open the housing, and output a signal in response, to trigger an appropriate tampering countermeasure.

This technique is advantageous in that it protects the entire electronic device, in contrast with the use of an internal flexible circuit mesh which only protects selected internal components. Hence, any significant tampering with the housing can be detected by the technique introduced here. Additionally, this approach renders it unnecessary to provide a separate flexible circuit mesh enshrouding the internal components (although it may be desirable to do so anyway to achieve even greater protection), thereby potentially lowering the overall cost of electronic device. Further, if an internal flexible circuit mesh is omitted, the electronic device can potentially be made smaller.

The conductive mesh can cover substantially all of the interior surfaces of the housing, or it may cover only one or more selected interior surfaces, or only certain portions of one or more interior surfaces (e.g., depending on the physical design of the device and the expected likelihood that a given surface will be targeted by a tampering attempt). To render it more difficult for an attacker to circumvent the mesh, the electrical contacts along the trace that are monitored can be selected differently from one device to the next, and can be selected based on a randomness function. The selection of contacts may be made during the process of manufacturing the electronic device or after manufacturing (e.g., during operation of the electronic device). In some embodiments, the mesh includes at least two metal traces that run very close together, in parallel, across one or more interior surfaces of the housing. In such an embodiment, one trace may be used to detect an open-circuit condition while the other trace is used to detect a short-circuit condition.

In certain embodiments the conductive mesh is affixed to the interior surface of the housing during manufacturing of the electronic device, by use of a plastic-on-metal fabrication process, such as laser direct structuring (LDS). In certain embodiments, the electronic device in which this tamper protection technique is implemented is a payment card reader designed to be coupled to a handheld mobile device. These features and aspects are discussed further below in connection with the accompanying figures.

FIG. 1 illustrates a simplified example of an electronic device in which the technique introduced here can be implemented. The exterior of the electronic device 1 is a housing 2, which has several interior surfaces 4. Enclosed by the housing 2 is a circuit board 5, on which are mounted a number of electronic components 6, the nature of which are not germane to the present discussion. A portion of the housing 2 is shown cut away to expose a portion of the interior of the device 1. The electronic device 1 may also have one or more external connectors and/or input/output (I/O) devices (not shown), to enable the electronic device 1 to connect to an external device and/or to a user.

Disposed along at least some of the interior surfaces 4 of the housing 2 are one or more conductive traces 3, which form one or more conductive loops, collectively referred to as a conductive "mesh." The traces 3 can be, for example, metal wires, or metal traces resulting from a patterned deposition process (e.g., such as used to form traces on printed circuit boards). In this regard the term "trace" is used herein to refer to any form of conductive path. In certain embodiments, for example, the traces 3 are affixed to the interior surface(s) 4 of the housing 2 during manufacturing of the electronic device 1, by use of a plastic-on-metal fabrication process, such as LDS. In other embodiments, a different technique may be used to affix the traces 3 to the interior surfaces 4 of the housing 2 (e.g., depending on the material composition of the housing 2), such as printed conductive ink, conventional electroplating, chemical deposition, dry plasma metal firm deposition, etc.

Each conductive trace 3 is coupled to a detector (not shown in FIG. 1), which can be mounted on circuit board 5 or in another location within the device 1, and which can detect an open-circuit condition, a short-circuit condition, or both, on the mesh. In embodiments in which the conductive traces 3 are disposed on more than one interior surface 4 of the housing 2 (such as shown in FIG. 1), the traces 3 on any two different surfaces 4 may be physically connected to each other, or they may be physically separate from each other.

Figure 2:
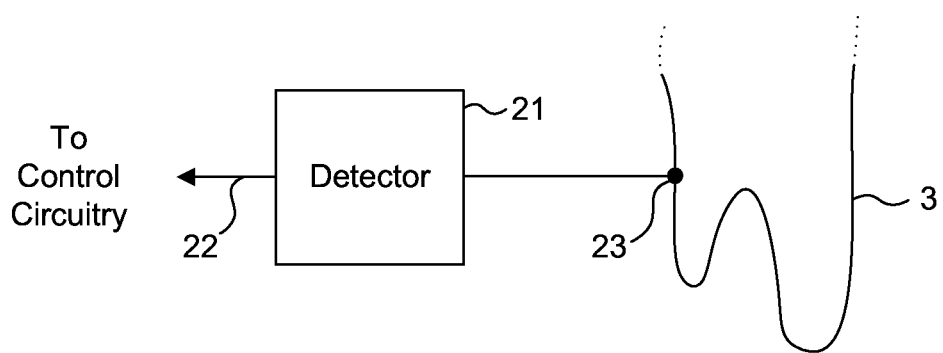
FIG. 2 conceptually illustrates the tamper protection technique, in which a detector is coupled to a conductive trace.

FIG. 2 further illustrates the tamper protection technique according to one embodiment. The conductive trace 3 is affixed to at least one interior surface (not shown in FIG. 2) of the housing 2 of the electronic device 1, as described above. A detector 21 is coupled to at least one electrical contact 23 on the trace 3. If an attempt to drill into or open the housing 2 breaks the trace 3, an open-circuit or short-circuit condition will result and will be detected by detector 21. Details of how such conditions may be detected are discussed below. In response to such detection, the detector 21 outputs a signal 22 to control circuitry (not shown) within the device 1. In response to receiving the signal 22, the control circuitry triggers an appropriate tampering countermeasure, such as disabling one or more functions of electronic device 1 and/or another device with which device 1 communicates.

Figure 3A:
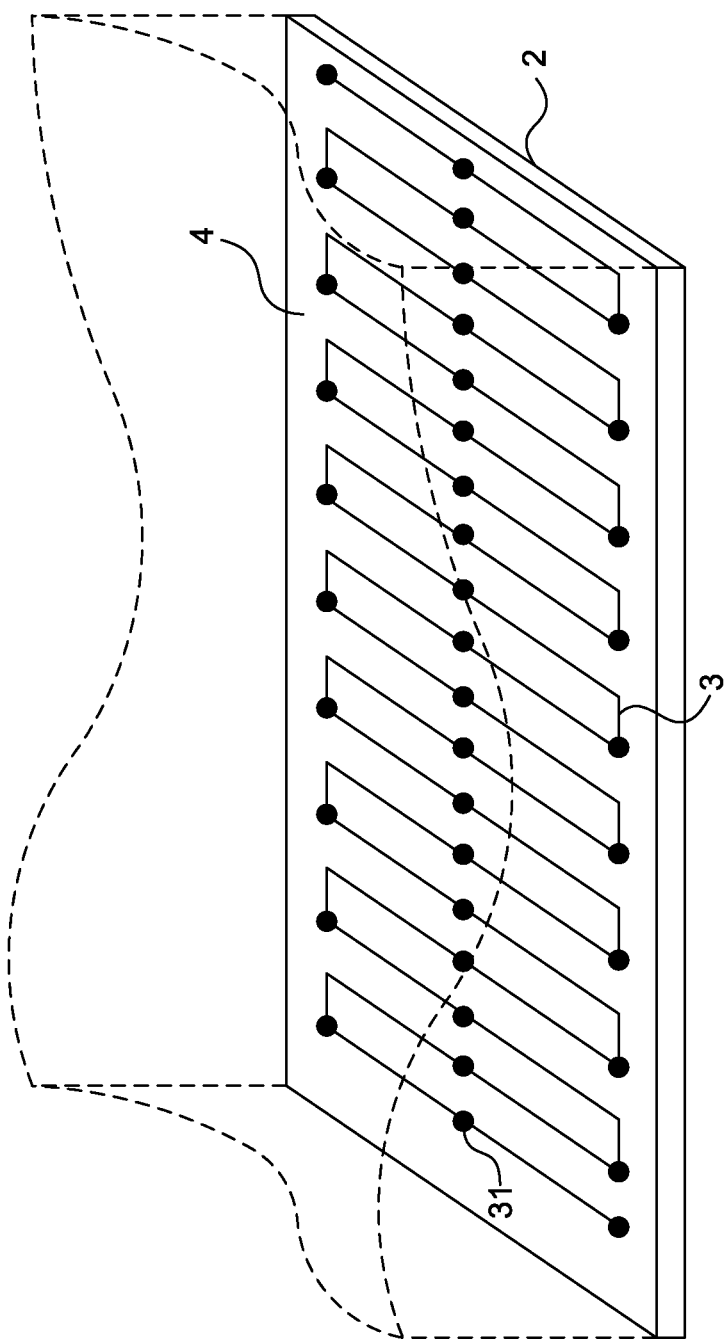
FIGS. 3A, 3B, 4A and 4B show examples of how conductive traces can disposed on interior surfaces of a housing of an electronic device.

FIG. 3A shows a more detailed view of an internal surface of the housing, according to one embodiment. As shown, a trace 3 that forms at least a portion of a conductive mesh can cover substantially all of at least one interior surface 4 of the housing 2, although that need not be the case. If a particular portion of the housing is inherently less vulnerable to tampering, then it may be unnecessary or undesirable to dispose a conductive trace along that portion. As shown, the trace 3 may be disposed in a zigzag or curving pattern. The pattern can be varied from one unit of the device to the next during the manufacturing process, to make the traces' locations less predictable and thereby make circumvention of the mesh more difficult.

A number of contact points 31 are provided on the trace 3 to allow electrical connection of the trace 3 to a detector (e.g., detector 21 in FIG. 2); however, in at least some embodiments, not all of the contact points 31 need to be connected in order to perform monitoring. Indeed, in one embodiment, only a single contact point 31 on each trace 3 needs to be connected to the detector. Accordingly, which particular contact points are selected for monitoring can be varied from one manufactured unit of electronic device 1 to the next. Furthermore, the selection can be made randomly, or at least based on a randomness function. The selection can be made during the manufacturing process, or it can be made after manufacturing is complete, e.g., by a selection component within the device.

Figure 3B:
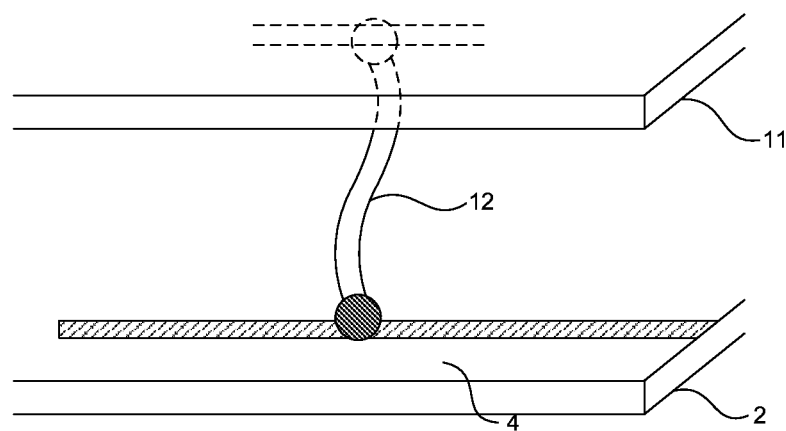

The conductive mesh can be electrically coupled to a detector on a circuit board within the electronic device 1 by any known or convenient electrical connection technique. For example, as shown in FIG. 3B, a conventional wire bond 12 may be used to connect a conductive trace 3 forming part of the mesh to a circuit board 11 within the device 1. The detector (not shown) may be mounted on the circuit board 11, which can be but is not necessarily the circuit board 5 shown in FIG. 1.

Figure 4A:
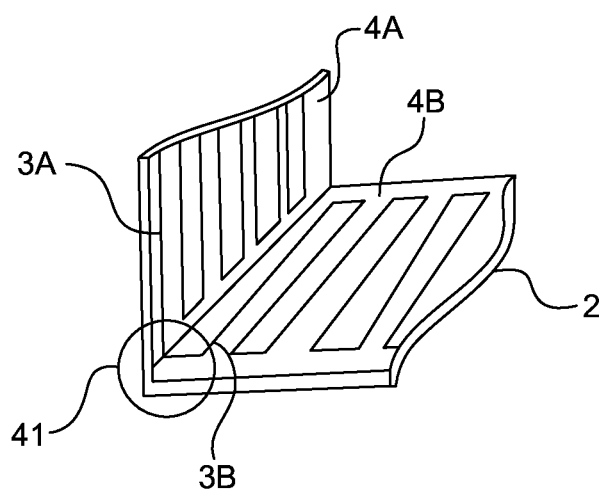
Figure 4B:
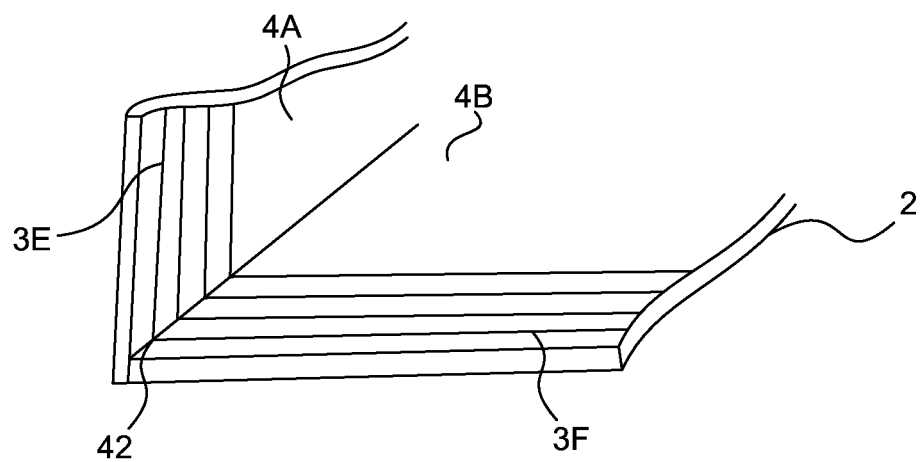

In various embodiments, a single trace traverses multiple interior surfaces of the housing 2, or separate traces are connected across multiple interior surfaces of the housing. As shown in FIG. 4A, a trace 3A on one interior surface 4A of the housing 2 may be connected to, or may be physically contiguous with, a trace 3B on another interior surface 4B of the housing 2 (in either case, the traces 3A and 3B may also be viewed as a single trace, since they are physically connected), as can be seen within circle 41. FIG. 4B shows an embodiment in which the mesh includes multiple traces (or multiple portions of traces) 3E and 3F that are connected or contiguous across different interior surfaces of the housing, as in FIG. 4A, but where the mesh also crosses from one interior surface to another at multiple locations 42.

As noted above, in certain embodiments, the contact point or points on the trace that are used for monitoring are selected from among a larger number of contact points that can be selected. This approach makes it more difficult for an attacker to predict which locations on the housing are protected by a conductive mesh. As also noted above, the selection of contacts can be done during the manufacturing process, or it can be done after manufacturing, e.g., by the device itself. The latter approach is illustrated in FIG. 5.

Figure 5:
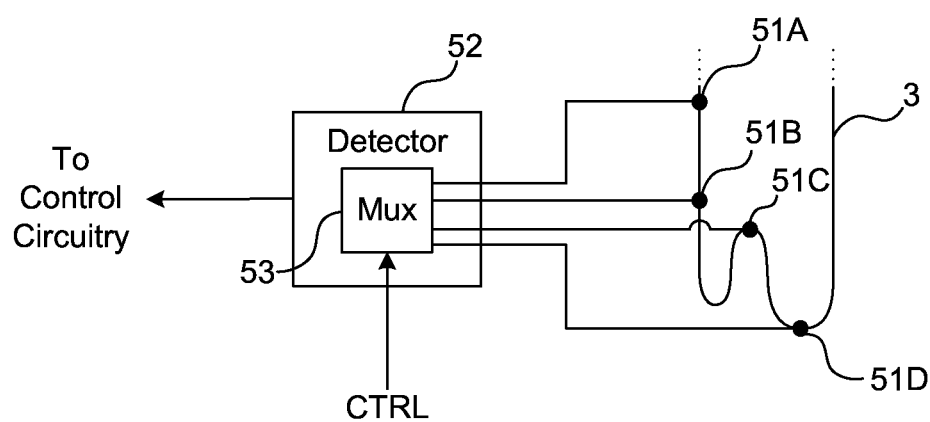
FIG. 5 shows a detector having a selector to select the detector's input from among multiple contacts of a conductive trace.

In FIG. 5, the trace 3 has four contacts, 51A, 51B, 51C and 51D. Note, however, that in actual practice a trace can have essentially any number of contacts. The detector 52 includes a selection circuit, e.g., a multiplexer 53, which in the illustrated embodiment has four separate inputs, each connected to a different one of the contacts 51A, 51B, 51C and 51D. The detector 52 provides its detection output to control circuitry (not shown) within the electronic device 1, as described above. A control signal CTRL is provided to the detector 52 to control which input of the multiplexer 53 is selected for monitoring at any given time. In this description, the control signal CTRL is referred to as a "first control signal" when it has a first value and is referred to as a "second control signal" when it has a second value. It will also be recognized, however, that the selection of contact(s) could instead be controlled by two or more separate control signals. The control signal CTRL may originate from the same control circuitry that receives the output of the detector 52, or it may originate from other control circuitry within the electronic device 1. The value of the control signal CTRL may be based at least partly on a randomness function (e.g., a pseudorandom number generator) or any other algorithm that provides a high degree of unpredictability in the selection.

Figure 6:
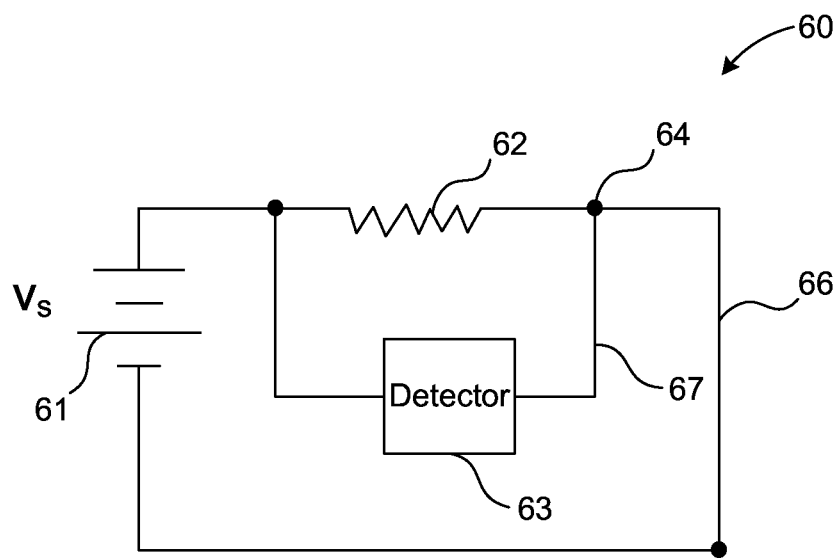
FIGS. 6 and 7 show different embodiments of a detection circuit to detect an open-circuit condition on a conductive trace.

FIG. 6 illustrates a simple example of a detection circuit that can be used to detect tampering in accordance with the technique introduced here. In the illustrated embodiment, a monitoring circuit 60 includes a voltage source 61 having value $V_s$ volts connected in series with a resistance 62 and a trace 66. The trace 66 is affixed to an interior surface of the housing of an electronic device as described above. A voltage detector 63 is connected in parallel with the load resistance 62. The primary input 67 of the voltage detector 63 is connected to a contact 64 on the trace 66.

In operation, the voltage detector 63 nominally detects a voltage of $V_s$ across the load resistance 62. If any break occurs in the trace 66 (e.g. as a result of tampering with the housing), however, an open-circuit condition will result, which will be detected by voltage detector 63 as a drop in voltage across the load resistance 62, from $V_s$ to zero volts.

Figure 7:
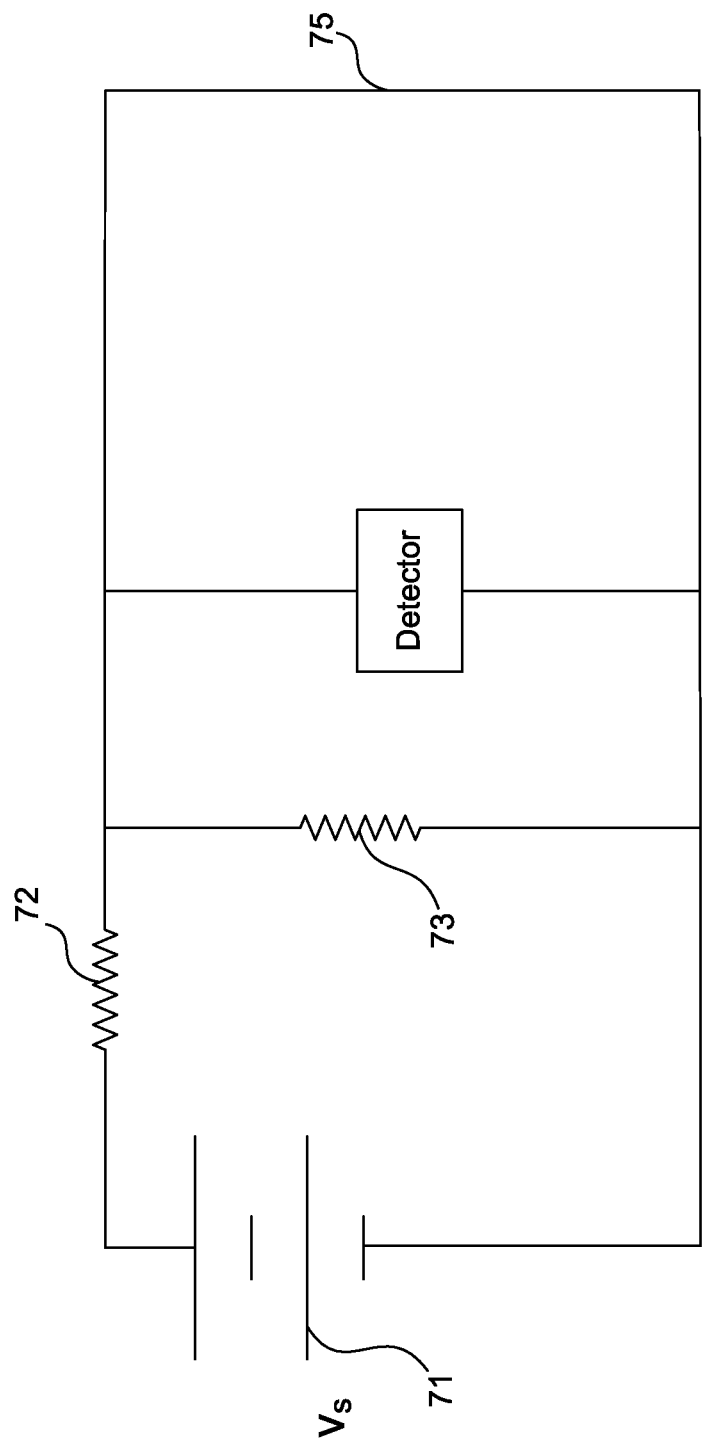

FIG. 7 illustrates a second example of a detection circuit that can be used to detect tampering. A voltage detector 74 is connected between two contacts on the trace 75. The trace 75 is connected in series with a voltage source 71 and a resistance 72. A second resistance 73 is connected in parallel with the voltage detector 74, between a downstream terminal of resistance 72 and the reference node of the voltage source 71.

In operation, the voltage detector 74 nominally detects zero volts, since the voltage detector 74 and resistance 73 are normally short-circuited by trace 75. If any break occurs in the trace 75 (e.g., as a result of tampering), however, current will flow through resistance 73, resulting in a voltage across resistance 73, which will be detected by voltage detector 74.

It will be recognized that FIGS. 6 and 7 are only examples of a detector circuit that can be used with the technique introduced here. Various other detection circuit configurations can be used instead of or in addition to these examples.

It may be desirable to be able to detect both open-circuit and short-circuit conditions in the conductive mesh. For example, a wrongdoer might deliberately attempt to short a tamper mesh in an effort to defeat it. One way to detect such an attempt is to provide, in the same local area as the primary trace, a signal of a different voltage. With such a configuration, if a deliberate shorting between two traces is done, there is a greater likelihood of also shorting to the nearby signal of a different voltage and thereby causing a tamper detection. Similarly, by using such a configuration, an attempt to break into the housing of electronic device may inadvertently cause a short-circuit prior to, or instead of, causing an open-circuit. For example, if a wrongdoer attempts to drill into the housing, the metal drill bit (which is conductive) may actually prevent (at least temporarily) an open-circuit condition but may cause a short-circuit between two or more closely-spaced traces.

Figure 8:
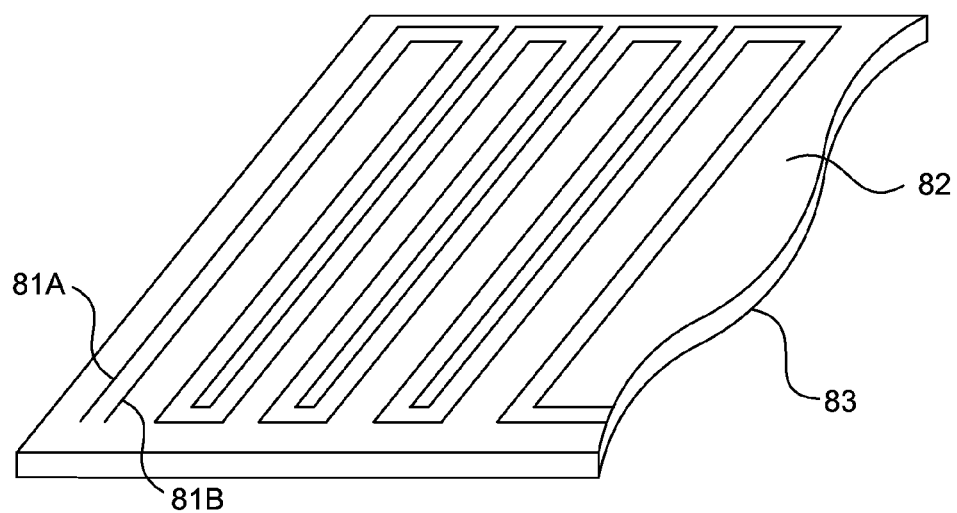
FIG. 8 shows an embodiment in which two conductive traces traverse an interior surface of the housing in proximity to, and in parallel with, each other.

Toward that end, in some embodiments the conductive mesh includes at least two metal traces that run very close together, in parallel, across one or more interior surfaces of the housing of an electronic device. In this context, "in parallel" refers to the spatial relationship between the traces, not necessarily their electrical configuration. An example of such an embodiment is shown in FIG. 8. As shown, two traces 81A and 81B traverse an interior surface 82 of the housing 83 in close proximity to each other and parallel to each other. In this context, "in proximity" means the two traces are as close together as reasonably possible in light of the relevant manufacturing constraints, which in one embodiment is, for example, within about 2 mm of each other. In a dual-trace embodiment, one trace may be used to detect an open-circuit condition while the other trace is used to detect a short-circuit condition. One of the traces may be connected to a detector that can detect open-circuit conditions while the other trace is connected to a detector that can detect short-circuit conditions. Alternatively, both traces 81A and 81B can be connected to a single detector that can detect both types of conditions.

Figure 9:
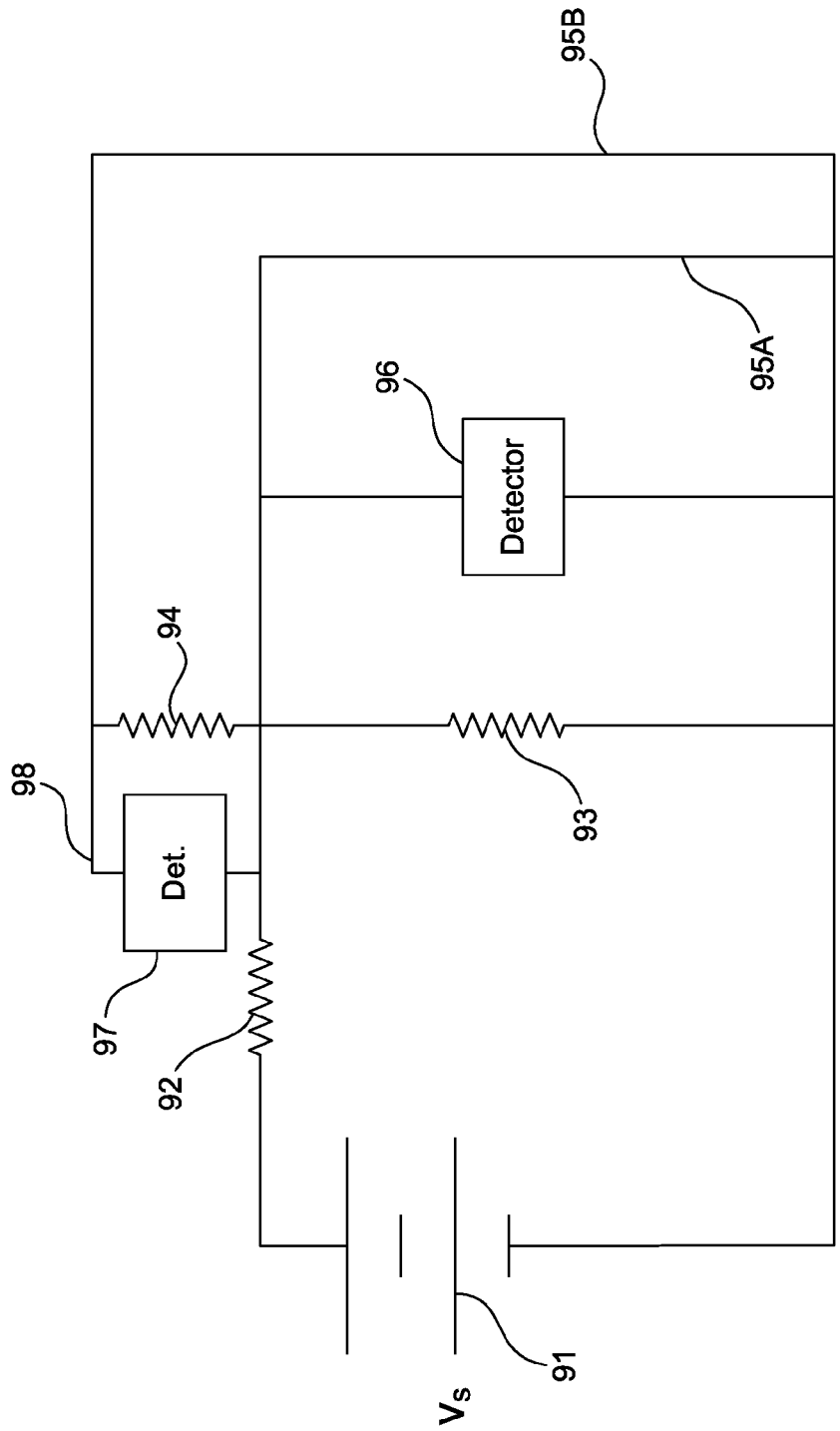
FIG. 9 shows an example of a detection circuit to detect both open-circuit and short-circuit conditions on a conductive mesh.

FIG. 9 schematically illustrates an example of a detection circuit that can be used with a dual-trace embodiment such as that shown in FIG. 8. The circuit includes a voltage source 91, resistances 92 and 93, a first trace 95A to be monitored, and a voltage detector 96, arranged in a configuration similar to that shown in FIG. 7. However, the circuit configuration also includes a second trace be monitored, trace 95B. Trace 95B is connected in series with a second voltage detector 97 connected between one terminal of resistance 92 and the reference terminal of the voltage source 91. It is assumed that trace 95B is disposed in close proximity to trace 95A, as shown in FIG. 8. An additional resistor 94 is also connected between the input terminal 98 of the voltage detector 97 and the node that forms the junction between resistances 92 and 93.

In operation, an open-circuit on trace 95A will be detected by voltage detector 96 in the manner described above regarding FIG. 7. A short-circuit that occurs between trace 95A and trace 95B (e.g., due to a metal tool bridging those two traces) will short-circuit resistance 94, causing voltage detector 97 to detect a reduction in the voltage across resistance 94 to zero volts.

As noted above, the tamper protection technique introduced above can be implemented in essentially any kind of electronic device that has an outer housing. One example of a device in which this technique would be advantageous is a miniaturized payment card reader designed to be coupled to a handheld mobile device, such as a smartphone or tablet computer. "Payment cards" in this context include debit cards, conventional credit cards, and so-called "smartcards" that have embedded integrated circuit chips, e.g., Europay-MasterCard-Visa (EMV) cards. Card readers of this type have been produced to enable merchants to accept payment cards by using their smartphones or tablet computers, without the need for a conventional credit card reader or cash register.

Figure 10:
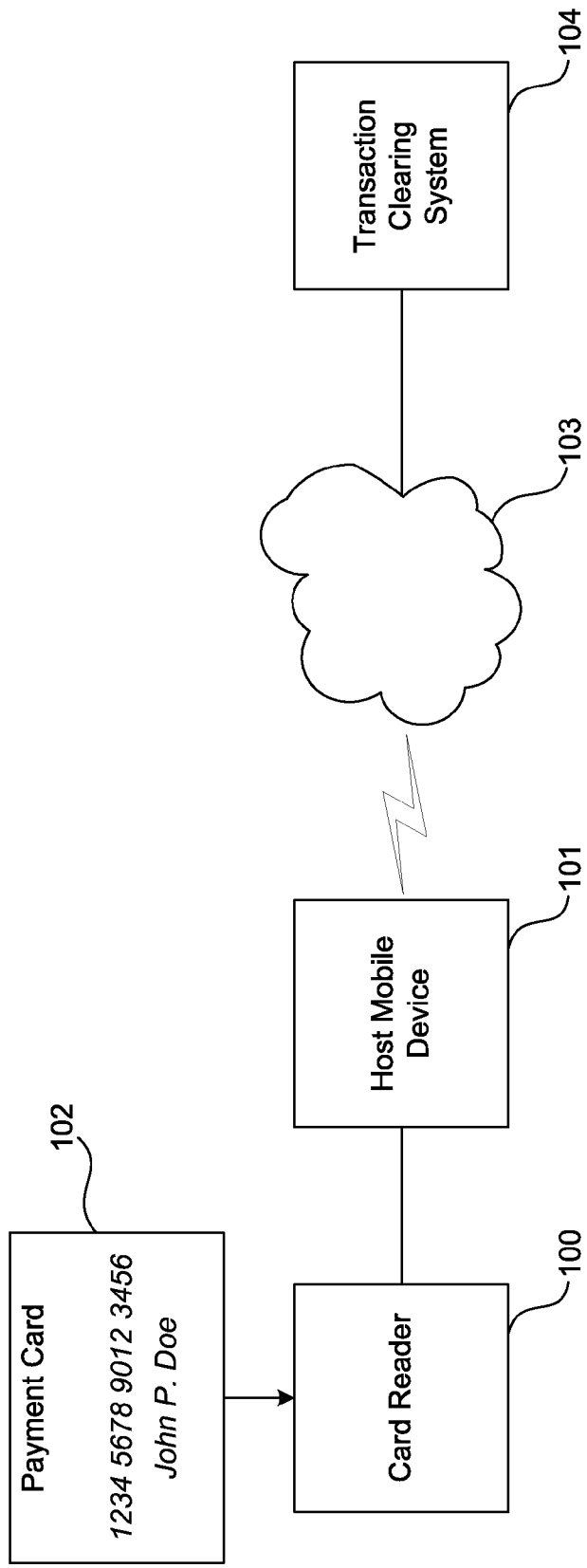
FIG. 10 shows a system that processes a payment card based transaction by use of a card reader coupled to a handheld mobile device.

FIG. 10 conceptually illustrates an environment in which such a device can operate. The card reader 100 is coupled to a host mobile device 101 belonging to a merchant. The host mobile device 101 may be, for example, a tablet computer or a smartphone. During a payment card transaction involving the merchant and the consumer, the card reader 100 reads information from a payment card 102 of the consumer (the "cardholder"). To accomplish this, the card reader 100 includes a card interface (not shown) which may include a conventional magnetic stripe reader, an EMV chip reader, or other suitable type of card interface or combination of interfaces. The card reader 100 reads information from the card 102, such as the cardholder's name, account number, expiration date and/or personal identification number (PIN) and may provide at least some of this information to the host mobile device 101. The host mobile device 101 communicates via a wireless network 103 with a remote transaction clearing system 104, to authenticate the cardholder and authorize the transaction. The transaction clearing system 104 can include one or more conventional data processing devices, such as one or more server-class computers, personal computers, hand-held devices, etc., some of which may be coupled to each other via one or more networks (not shown).

It will be recognized that the tamper protection technique introduced above can also be applied in the host mobile device 101, the transaction clearing system 104 and/or any other device that is part of the illustrated system.

Figure 11:
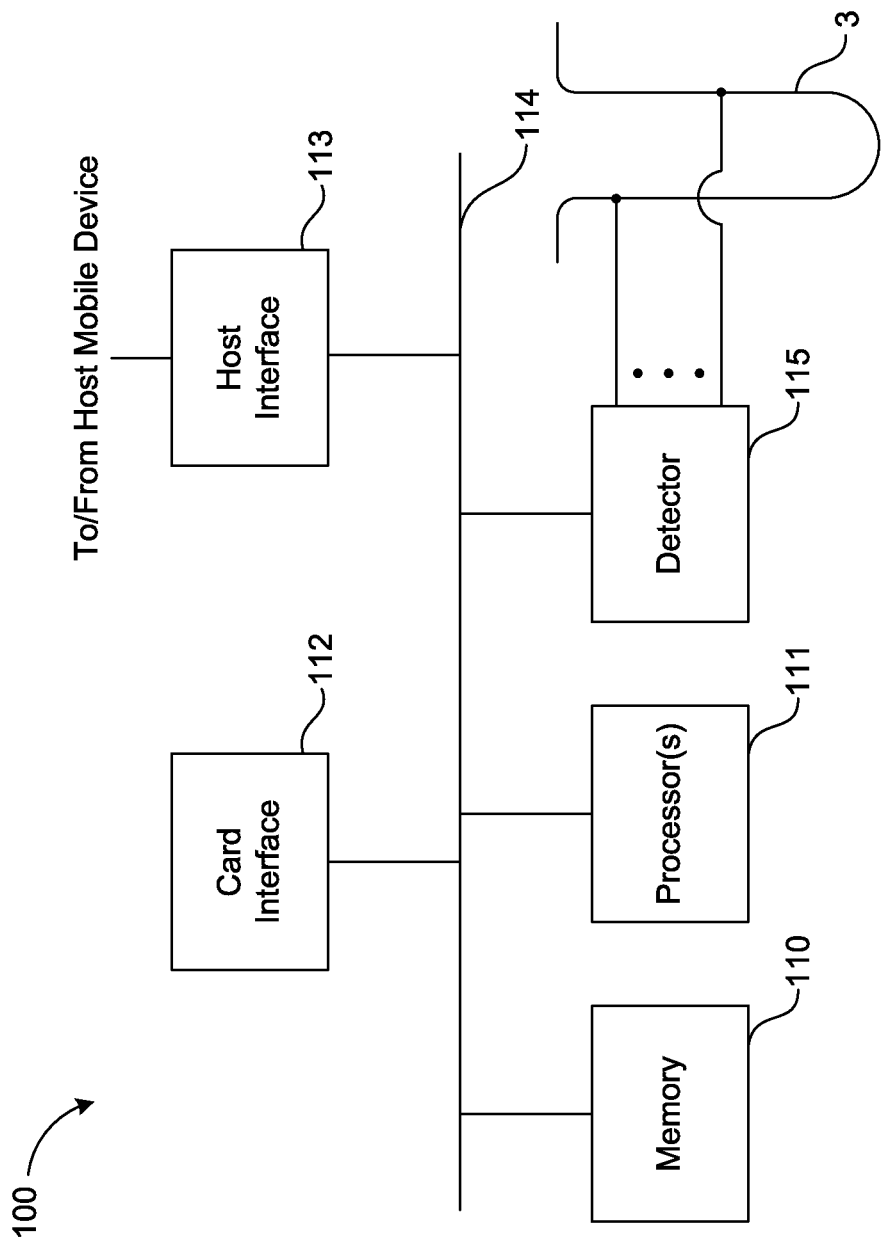
FIG. 11 is a high-level block diagram of the card reader.

FIG. 11 is a high-level block diagram showing an example of the architecture of the card reader 100. In the illustrated embodiment, the card reader 100 includes one or more processors 110, a memory 111, a card interface 112, and a host interface 113, all coupled to each other through an interconnect fabric 114. The interconnect fabric 114 may include one or more conductive traces, buses, point-to-point connections, controllers, adapters and/or other conventional connection devices.

Also coupled to the processor(s) 110 is a detector 115 that receives input from one or more contacts on a conductive mesh 116, which is affixed to an interior surface of the housing (not shown) of the card reader 100, as described above. The processor(s) 110 may be or include, for example, one or more general-purpose programmable microprocessors, microcontrollers, application specific integrated circuits (ASICs), programmable gate arrays, or the like, or a combination of such devices. The processor(s) 110 control the overall operation of the card reader 100. Additionally, the processor(s) 110 may respond to a detection signal from the detector 115 by disabling one or more functions of the card reader 100 or of the host mobile device 101. For example, in response to a detection signal from the detector 115, the processor(s) 110 may signal the host mobile device 101 (via the host interface 113) to disable all communications with the transaction clearing system 104. As another example, the processor(s) 110 may respond to the detection signal by disabling all read access to the memory 111. As yet another example, the processor(s) 110 may cause all functionality of the card reader 100 to be disabled in response to a detection signal, i.e., essentially to "self-destruct" functionally.

Memory 111 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 111 may store data and instructions that configure the processor(s) 110 to execute operations in accordance with the techniques described above.

The card interface 112 may be a conventional magnetic stripe reader, EMV chip reader, or other suitable type of card interface, or combination of such interfaces. The host interface 113 enables the card reader to communicate with the host mobile device 101. In various embodiments, the host interface 113 may provide either a wired or wireless connection to the host mobile device 101. In one embodiment, the host interface 113 includes a connector (not shown) that connects to an audio jack of the host mobile device 101.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A payment card reader with built-in tamper protection, comprising:
   a card interface to read data from a payment card;
   circuitry coupled to the card interface, including a memory and a processor to control operation of the payment card reader;
   a housing that encloses the circuitry;
   a connector through which the payment card reader can communicate with a hand-held mobile device during a payment transaction;
   a first metal trace affixed to an interior surface of the housing;
   a first detector coupled to the first metal trace, to detect a first electrical condition that occurs in response to tampering with the housing, and in response to the first electrical condition, to output a signal that causes a function of the payment card reader or the hand-held mobile device to be disabled; and
   a multiplexer having a plurality of inputs, each of the inputs coupled to a separate one of a plurality of contacts on the first metal trace, the multiplexer configured to respond to a first control signal by selecting a first one of the plurality of inputs via which the first detector is to monitor for the first electrical condition and to respond to a second control signal by selecting a second one of the plurality of inputs via which the first detector is to monitor for the first electrical condition, wherein each of the first control signal and the second control signal is generated based on a randomness function.

2. A payment card reader as recited in claim 1, further comprising:
   a second metal trace affixed to the interior surface of the housing; and
   a second detector coupled to the second metal trace, to detect a second electrical condition, different from the first electrical condition.

3. A payment card reader as recited in claim 2, wherein portions of the first and second metal traces traverse a portion of the interior surface of the housing along parallel paths.

4. A payment card reader as recited in claim 3, wherein said portions of the first and second metal traces are disposed in proximity to each other.

5. A payment card reader as recited in claim 1, wherein the first metal trace traverses a substantial portion of at least one side of the interior surface of the housing.

6. An electronic device comprising:
   an electrical circuit;
   a housing that encloses the electrical circuit;
   a first conductor affixed to an interior surface of the housing;
   a first detector coupled to the first conductor, to detect a first electrical condition associated with the first conductor, the first electrical condition indicative of tampering with the housing; and
   a multiplexer coupled to receive a plurality of inputs, each of which is coupled to a separate one of a plurality of contacts on the first conductor, the multiplexer configured to respond to a first control signal by selecting a first one of the plurality of inputs via which the first detector is to monitor for the first electrical condition and to respond to a second control signal by selecting a second one of the plurality of inputs via which the first detector is to monitor for the first electrical condition, wherein each of the first control signal and the second control signal is generated based on a randomness function.

7. An electronic device as recited in claim 6, wherein the electronic device is a payment card reader configured to be coupled to a hand-held mobile device.

8. An electronic device as recited in claim 6, wherein the first conductor is a metal loop that traverses a substantial portion of at least one side of the interior surface of the housing.

9. An electronic device as recited in claim 6, further comprising:
   a second conductor affixed to an interior surface of the housing; and
   a second detector coupled to the second conductor, to detect a second electrical condition, different from the first electrical condition, associated with the second conductor, the second electrical condition indicative of tampering with the housing.

10. An electronic device as recited in claim 9, wherein portions of the first and second conductors traverse a portion of the interior surface of the housing along parallel paths.

11. An electronic device as recited in claim 10, wherein said portions of the first and second conductors are disposed in proximity to each other.

12. An electronic device as recited in claim 6, wherein the first conductor has been affixed to the interior surface of the housing by a plastic-on-metal fabrication process.

13. A method of detecting tampering in an electronic device, the method comprising:
- receiving a signal from each of a plurality of contacts on a metal loop, the metal loop being affixed to an interior surface of a housing of the electronic device;
- generating each of a first control signal and a second control signal based on a randomness function;
- in response to the first control signal, selecting a first one of the received signals to monitor for a first electrical condition;
- in response to the second control signal, selecting a second one of the received signals to monitor for the first electrical condition;
- monitoring for the first electrical condition on the metal loop;
- permitting an operation to be performed by the electronic device while said monitoring does not detect the first electrical condition on the metal loop; and
- disabling the operation in response to detecting the first electrical condition on the metal loop.

14. A method as recited in claim 13, wherein the electronic device is a payment card reader configured to be coupled to a hand-held mobile device.

* * * * *